Sept. 22, 1970     A. STREET     3,529,797
SUPPORTING STANDS FOR INSTRUMENTS
Filed April 15, 1968     2 Sheets-Sheet 1

INVENTOR:
Arthur Street

BY Spencer & Kaye
Attorneys

United States Patent Office 3,529,797
Patented Sept. 22, 1970

3,529,797
SUPPORTING STANDS FOR INSTRUMENTS
Arthur Street, Tamworth, England, assignor to Polar Hydraulics Limited, Stafford, England
Filed Apr. 15, 1968, Ser. No. 721,390
Claims priority, application Great Britain, Apr. 14, 1967, 17,148/67
Int. Cl. F16m 13/00
U.S. Cl. 248—160
1 Claim

ABSTRACT OF THE DISCLOSURE

A supporting stand including a flexible support element extending upwardly from a base, the flexible support element being arranged to be locked rigid upon movement of a wedge member into engagement with cam faces provided on an end member of the flexible element upon operation of a fastener associated with the wedge.

BACKGROUND OF THE INVENTION

Field of the invention

The invention relates to a supporting stand including a flexible element consisting of a number of hollow parts through which a cable is passed, the flexible element being arranged to be locked rigid on effecting tautening of the cable.

Description of the prior art

One form of such a supporting stand is described in U.S. Pat. No. 3,168,274 and in that specification the means for effecting tautening of the cable to lock the flexible element rigid comprises a rotatable handle, connected to the cable within the lower member of the flexible element. A disadvantage of this locking mechanism construction is that it is difficult to disassemble thereby ruling out the possibility of such a stand being used in operating theatres since for surgical use it is essential that the stand be disassemblable for sterilization purposes.

According to the invention there is provided a supporting stand for instruments which includes a base and a flexible element extending upwardly from said base, the flexible element consisting of a plurality of interengaging hollow parts through which a cable passes and means provided for effecting tautening of the cable whereby the flexible element can be locked rigid, the improvement which comprises forming said base as a housing shaped to receive an end member of the flexible element, which end member includes means for locating an end of the cable, the end member being formed to provide a pair of cam faces and said tautening means including a wedge having faces arranged to contact the cam faces of the end member, there being a fastener associated with the wedge and operation of the fastener effecting movement of the wedge relative to the end member such that a wedging action is effected and tautening of the cable is obtained therby locking the flexible element in a position into which it has been moved.

The above described tautening means comprising a wedge arranged to engege cam faces of the end member allows ready disassembly of the supporting stand enabling it to be used for surgical purposes and the various components of the stand are preferably formed of stainless steel so that they can be treated in a sterilizer without adverse effect thereon.

DESCRIPTION OF THE PREFERRED EMBODIMENT

Figure 1:
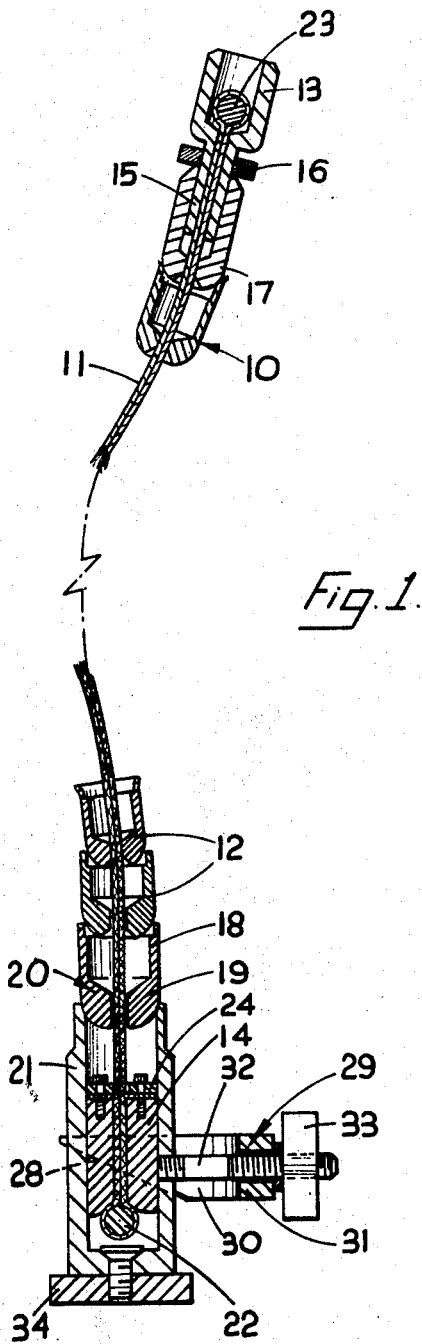
FIG. 1 is a vertical view of the stand.
Figure 2:
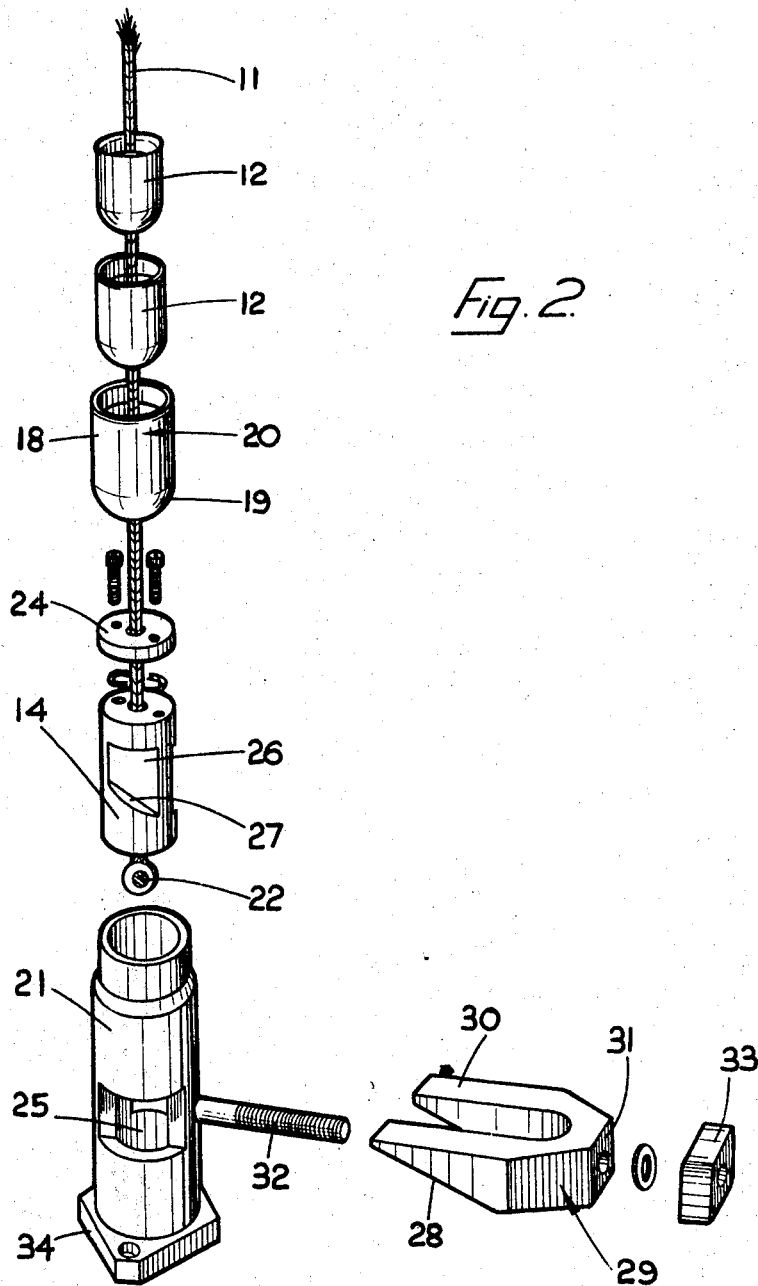
FIG. 2 is a detail exploded perspective view.

The supporting stand includes aflexible element 10 which consists of a wire rope or cable 11 passed through a plurality of cup-like members 12, the ends of the wire rope being connected permanently to the end members 13 and 14 of the flexible element 10.

The upper end member 13 of the flexible element 10 is provided with a clamping attachment (not shown) of any convenient form whereby the appropriate tools, instruments or the like may be held in a desired position by the clamping attachment as and when required by the surgeon.

The upper end member 13 includes a downwardly projecting externally screw-threaded spigot 15 through which the wire rope 11 passes and onto which a screw-threaded adjustment element 16 is fitted, the adjustment element 16 being in the form of a disc the periphery of which is knurled. The adjacent member 17 of the flexible element includes an internally threaded end part in which the end of the spigot 15 is received such that the tension in the wire rope 11 can be adjusted by effecting relative rotation between the end member 13 and the member 17 adjacent to it thereby adjusting the relative axial positions thereof, the members 13 and 17 then being held against relative rotation by tightening the disc 16 so that it abuts the adjacent member 17.

The remainder of the members of the flexible element are (as mentioned above) of cup-shape, each being arranged so that the mouth of one receives the base of the next member, each cup-like member including a cylindrical portion 18 integral with a part-spherical portion 19, the configuration of the two portions being such that they do not quite merge in that the part-spherical portion 19 is slightly greater than half a sphere. In this way the degree of relative pivotal movement between one cup-like member and the next is greater than would be the case if the part-spherical portion 19 were half a sphere, and were to merge smoothly with the cylindrical portion 18.

The lowest cup-like member 20 of the flexible element 10 is of larger dimensions than the remainder of the cup-like members 12 and is arranged to seat in the open mouth of a cylindrical housing 21 which forms a base for supporting stand. The lower end member 14 of the flexible element is of solid form and includes a pin 22 for locating one end of the wire cable, the other end of the wire rope 11 being located at the upper end by a pin 23. The wire rope 11 is of double thickness, the ends proper of the wire being located by a plate 24 secured by screws to end member 14 and the wire then being looped over the pins 22 and 23.

The lower end member 14 is received in a cylindrical chamber in the cylindrical housing 21 and a pair of diametrically opposed openings 25 are formed in the wall of the chamber. The lower end member 14 is formed with a pair of flats 26 located diametrically opposite to each other such that, when the end member 14 is within the cylindrical chamber, the flats 26 are aligned with the windows or openings 25 in the wall of the chamber.

The shape of the end member in the vicinity of the flats 26 is such that, beneath each flat, there is provided an inclined cam surface 27, the cam surfaces being inclined at an angle of 30° to the horizontal. The cam surfaces are arranged to cooperate with wedge faces 28 of a U-shaped wedge member 29. The U-shape of the wedge member 29 is such that it provides a pair of parallel arms 30 interconnected by a base 31 and the base 31 is formed with a through aperture. A shaft 32 projects from the housing 21 at right angles to the cylindrical axis thereof and the end of said shaft 32 is externally screw-threaded.

The U-shaped wedge member 29 is fitted so that the shaft 32 passes through the aperture in the base 31 of the U with the arms 30 directed towards the housing and with the inclined ends of the arms 30 engaging with the flats 26 of the end member, the ends of the arms being aligned with the windows or openings 25 in the wall of the housing 21. A wing nut 33 is then threaded onto the end of the threaded shaft 32 and is tightened onto the shaft thereby urging the U-shaped wedge member 29 towards the housing 21. The wedge faces 28 are inclined at an angle of 30° to the horizontal so that urging of the wedge member 29 towards the housing 21 effects relative movement between the wedge faces 28 and the cam surfaces 27 of the end member 14. The effect of this is to move the end member 14 downwardly within the housing 21 and downwardly relative to the next but one end member 20 of the flexible element 10. This makes the wire rope or cable 11 taut and, when the wing nut 33 has been tightened to the appropriate degree, the flexible element 10 is locked solid in the position into which it has been moved.

The base of the housing 21 is provided with an attachment plate 34 whereby it may be secured positively to a supporting table or other fixed structure and the various components of the stand can readily be separated from each other to facilitate sterilizing thereof, i.e. the wedge member 28 is moved out of engagement with the flats 26 so that end member 14 can be taken out of the housing 21 and the flexible element 10 can then be taken to pieces.

I claim:

1. In a supporting stand for instruments which includes a base and a flexible element extending upwardly from said base, the flexible element consisting of a plurality of interengaging hollow members through which a cable is passed and locking means provided for effecting tautening of the cable whereby the flexible element is locked rigid, the improvement which comprises:

(a) forming said base as a housing;
(b) arranging an end member of the flexible element so that it can be removably received in the housing;
(c) the end member including means for locating an end of the cable and being formed to provide a pair of cam faces;
(d) the tautening means including a wedge having faces arranged to contact the cam faces of said end member;
(e) a threaded shaft projecting from the housing and supporting the wedge;
(f) a fastening threadedly engaged with said shaft and movement of the fastener relative to the shaft in a direction towards the housing effecting movement of the wedge relative to the end member such that a wedging action is effected and tautening of the cable is obtained whereby the flexible element is locked in the position into which it has been moved; and
(g) the housing including a generally cylindrical chamber formed with a pair of windows and in which the end member of the flexible element is shaped to afford flats which can be aligned with said windows, the lower surfaces of the flats affording the cam faces.

References Cited

UNITED STATES PATENTS

| | | | |
|---|---|---|---|
| 870,429 | 11/1907 | Grimler | 248—160 |
| 1,519,308 | 12/1924 | Hood | 85—8.6 |
| 1,614,221 | 1/1927 | Westbrook | 85—50 |
| 1,721,363 | 7/1929 | Wesp | 85—50 |
| 1,871,518 | 8/1932 | Havemeyer et al. | 85—50 |
| 2,510,198 | 6/1950 | Tesmer | 248—274 |
| 3,168,274 | 2/1965 | Street | 248—176 |

FOREIGN PATENTS

| | | |
|---|---|---|
| 1,093,371 | 11/1967 | Great Britain. |
| 816,352 | 10/1951 | Germany. |
| 185,266 | 7/1936 | Switzerland. |

MARION PARSONS, Jr., Primary Examiner

U.S. Cl. X.R.

248—176, 274